(12) United States Patent
Hattori et al.

(10) Patent No.: US 7,896,405 B2
(45) Date of Patent: Mar. 1, 2011

(54) CONNECTOR FOR FUEL TANK

(75) Inventors: Toshio Hattori, Sagamihara (JP);
Yasutomo Kobayashi, Yamato (JP);
Tsuyoshi Kato, Inagi (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 0 days.

(21) Appl. No.: 12/224,982

(22) PCT Filed: Feb. 28, 2007

(86) PCT No.: PCT/JP2007/053750
§ 371 (c)(1),
(2), (4) Date: Oct. 31, 2008

(87) PCT Pub. No.: WO2007/122860
PCT Pub. Date: Nov. 1, 2007

(65) Prior Publication Data
US 2009/0116899 A1    May 7, 2009

(30) Foreign Application Priority Data

Mar. 27, 2006 (JP) .................. 2006-084506

(51) Int. Cl.
*F16L 13/02* (2006.01)
(52) U.S. Cl. .................... 285/288.1; 285/141.1; 285/423
(58) Field of Classification Search ............... 285/141.1, 285/288.1, 21.1, 423
See application file for complete search history.

(56) References Cited

U.S. PATENT DOCUMENTS

| 6,733,048 | B2 * | 5/2004 | Kurihara et al. | 285/423 |
| 6,866,297 | B2 * | 3/2005 | Morohoshi et al. | 285/21.1 |
| 6,905,147 | B2 * | 6/2005 | Kertesz | 285/285.1 |
| 6,913,295 | B2 * | 7/2005 | Kimisawa et al. | 285/423 |
| 7,066,498 | B2 * | 6/2006 | Kertesz | 285/288.1 |
| 7,090,262 | B2 * | 8/2006 | Kurihara et al. | 285/423 |
| 7,210,709 | B2 * | 5/2007 | Kertesz | 285/288.1 |
| 7,455,326 | B2 * | 11/2008 | Matsuzaki et al. | 285/288.1 |
| 7,490,863 | B2 * | 2/2009 | Nagakura et al. | 285/288.1 |

FOREIGN PATENT DOCUMENTS

| JP | 2001-113590 | 4/2001 |
| JP | 2001-113963 | 4/2001 |
| JP | 2002-137643 | 5/2002 |
| JP | 2002-211254 | 7/2002 |
| JP | 2003-072399 | 3/2003 |
| JP | 2003-269274 A | 9/2003 |
| JP | 2003-276457 | 9/2003 |
| JP | 2003-536023 | 12/2003 |

* cited by examiner

*Primary Examiner* — David E Bochna
(74) *Attorney, Agent, or Firm* — Manabu Kanesaka

(57) ABSTRACT

A connector includes an outer melt-bonding projection 2 integrally formed with a projecting end 10a of a flange 10 of a base member 1, and an inner melt-bonding member 3 having an upper side 30 unified to a lower surface 10g of the flange 10 of the base member 1 and configured to have an outer lateral side 31 unified to an inner lateral side 20 of the outer melt-bonding projection 2. The outer melt-bonding projection 2 is formed of a first synthetic resin, which is melt-bondable to an outer layer Ta of a fuel tank T, the base member 1 is formed of a second synthetic resin difficult to pass a gas produced from fuel therethrough and adaptable to the first synthetic resin, and the inner melt-bonding member 3 is formed of the first synthetic resin.

7 Claims, 5 Drawing Sheets

CONNECTOR FOR FUEL TANK

TECHNICAL FIELD

The present invention relates to an improved connector, which is adapted to connect a fuel tank for an automobile or the like with a delivery pipe serving for, e.g. intake of fuel into the fuel tank, delivery of fuel from the fuel tank, or delivery of a gas from the fuel tank.

BACKGROUND ART

There has been known a connector, which connects a fuel feeding pipe or an air pipe to a fuel tank having at least an outer layer formed of a synthetic resin, and which includes a base member having a flange and a passage, an outer melt-bonding projection and an inner melt-bonding member, the flange being of such a size as to cover an opening formed to pass through the fuel tank, the passage communicating with the fuel feeding pipe or the like, the outer melt-bonding projection disposed on a projecting end of the flange of the base member, and the inner melt-bonding member being formed in a ring shape (see Patent Document 1 identified below).

In the connector disclosed in Patent Document 1, it is possible to unify the outer melt-bonding projection and the inner melt-bonding member since the outer melt-bonding projection and the inner melt-bonding member are adapted to each other because of being formed of polyethylene or an alloy containing polyethylene. On the other hand, in this connector, the base member, which is formed of a synthetic resin having a gas barrier property (a synthetic resin difficult to pass a gas, such as hydrocarbon, produced from fuel therethrough; e.g. a polyacetal resin disclosed as one example in Patent Document 1), is not adaptable with the synthetic resin forming the inner melt-bonding member. For this reason, it has been impossible to unify a lower surface of the flange of the base member and an upper side of the inner melt-bonding member even by molding the inner melt-bonding member by insert-molding with the base member used as an insert, or by simultaneously molding both of the flange and the inner melt-bonding member. In such a circumstance, since a gas, which has arrived at the lower surface of the flange through the opening of the fuel tank, reaches an inner lateral side of the outer melt-bonding projection through an contact interface between the lower surface of the flange and the upper side of the inner melt-bonding member, there has been no other way but to reduce the leakage of the gas by increasing the wall thickness of the outer melt-bonding projection.

Patent Document 1: JP-A-2002-211254

DISCLOSURE OF THE INVENTION

Object to be Accomplished by the Invention

It is a main object of the present invention to provide such a type of connector, which improves the integration between a portion of the connector serving for melt-bonding to a fuel tank and a portion of the connector serving for preventing the leakage of a gas produced from fuel in order to further reduce the leakage of the gas through the melt-bonded portion after melt-bonding to the fuel tank.

Means to Accomplish the Object

In order to attain the above-mentioned problem, the present invention provides a connector for a fuel tank, is which includes the following features (1) to (5):

(1) the connector, which is adapted to connect a fuel tank with a delivery pipe serving for intake of fuel into the fuel tank, delivery of fuel from the fuel tank, delivery of a gas from the fuel tank, and the like;

(2) the connector including:
a base member having a flange and a passage, the flange being of such a size as to cover an opening formed in the fuel tank, the passage being adapted to communicate with the delivery pipe;
an outer melt-bonding projection integrally formed with at least a projecting end of the flange of the base member;
an inner melt-bonding member formed in a ring shape and being of such a size as to house the opening formed in the fuel tank, the inner melt-bonding member having an upper side unified to a lower surface of the flange of the base member and configured to have an outer lateral side unified to an inner lateral side of the outer melt-bonding projection;

(3) the outer melt-bonding projection being formed of a first synthetic resin, which is melt-bondable to an outer layer of the fuel tank;

(4) the base member being formed of a second synthetic resin, which is an alloy of the first synthetic resin and a second synthetic resin difficult to pass a gas produced from fuel therethrough, or a second synthetic resin difficult to pass a gas produced from fuel therethrough and adaptable to the first synthetic resin; and (5) the inner melt-bonding member being formed of the first synthetic resin.

In the connector thus configured, the outer melt-bonding projection and the inner melt-bonding member are formed of the first synthetic resin, and the base member is formed of an alloy of the first synthetic resin and the second synthetic resin or the second synthetic resin adaptable to the first synthetic resin. Accordingly, the outer melt-bonding projection and the inner melt-bonding member are melted and unified at contacting portions therebetween, and a combination of the base member and the outer melt-bonding projection and a combination of the base member and the inner melt-bonding member are melted and unified at contacting portions therebetween, respectively. A gas, which is produced from fuel, is prevented from leaking through the opening by the second synthetic resin forming the base member. Further, the leakage of the gas through the melt-bonded portions between the connector and the fuel tank is minimized since the base member is unified to the outer melt-bonding projection and the inner melt-bonding member at the melt-bonded portions as described above.

When the connector is formed by insert-molding with the inner melt-bonding member used as an insert, it is possible to easily and properly unify the inner melt-bonding member to the base member and the outer melt-bonding projection.

In a case where the connector is formed by such insert-molding, when the second synthetic resin is set to have a higher melting point than the first synthetic resin, portions of the inner melt-bonding member, as the insert, in contact with the base member to be molded is easily and re-melted by the second synthetic resin filled in a space for molding the base member in the mold during insert-molding. Thus, the connector is molded with the inner melt-bonding member being firmly unified to the base member.

When the first synthetic resin is formed of the same synthetic resin as the synthetic resin forming the outer layer of the fuel tank, it is possible to adaptably fix the connector to the fuel tank by melt-bonding the inner melt-bonding member and the outer melt-bonding projection.

EFFECT OF THE INVENTION

In accordance with the connector for a fuel tank with the present invention applied thereto, it is possible to improve the integration between a portion of the connector serving for melt-bonding to a fuel tank and a portion of the connector serving for preventing the leakage of a gas produced from fuel and to effectively reduce the leakage of the gas through the melt-bonded portion after melt-bonding to the fuel tank.

BEST MODE FOR CARRYING OUT THE INVENTION

Now, a typical embodiment of the present invention will be described in reference to FIG. 1 to FIG. 5.

Figure 1:
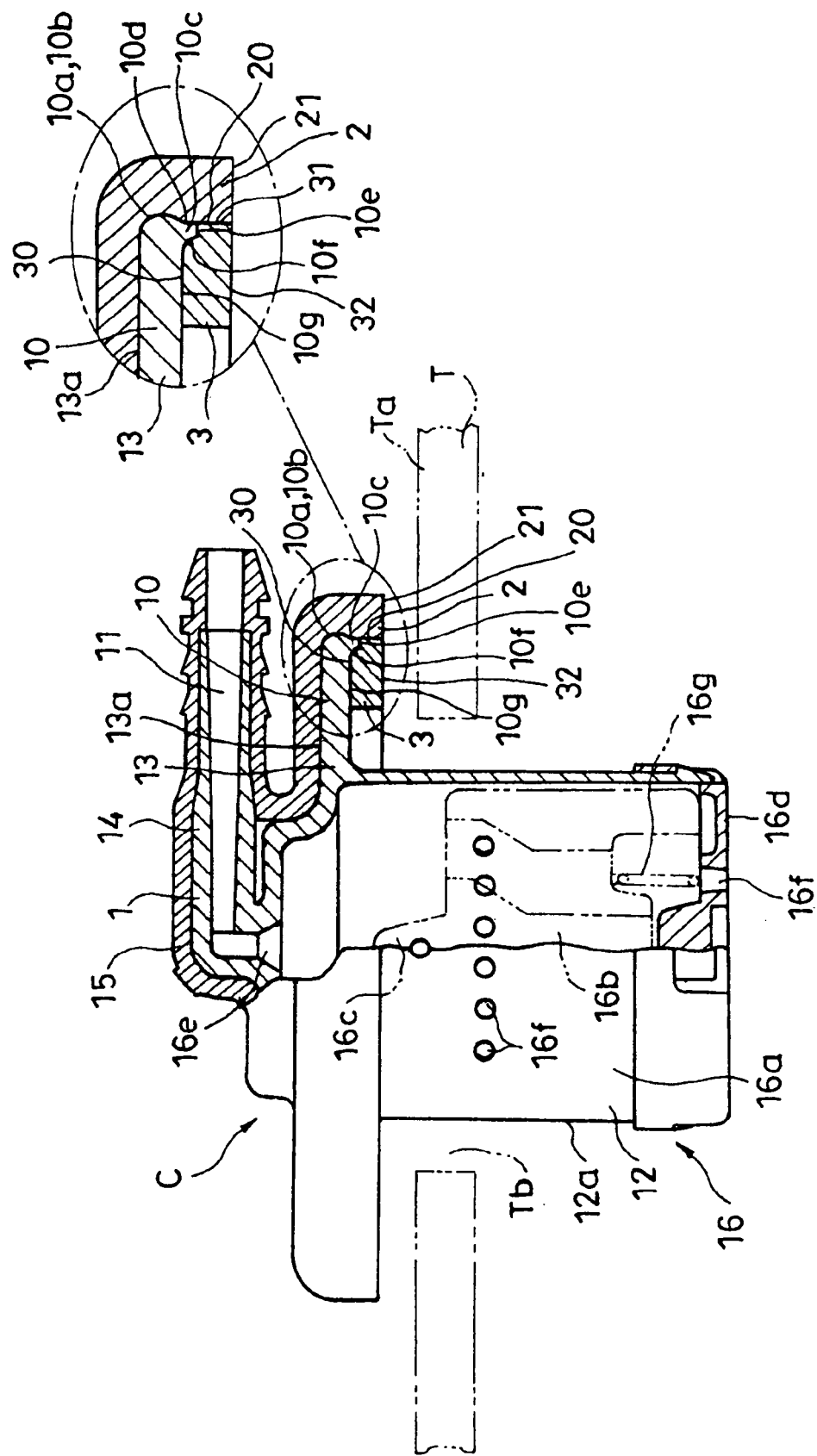
FIG. 1 is a schematic view of the connector according to an embodiment of the present invention, essential parts thereof being shown in section.
Figure 2:
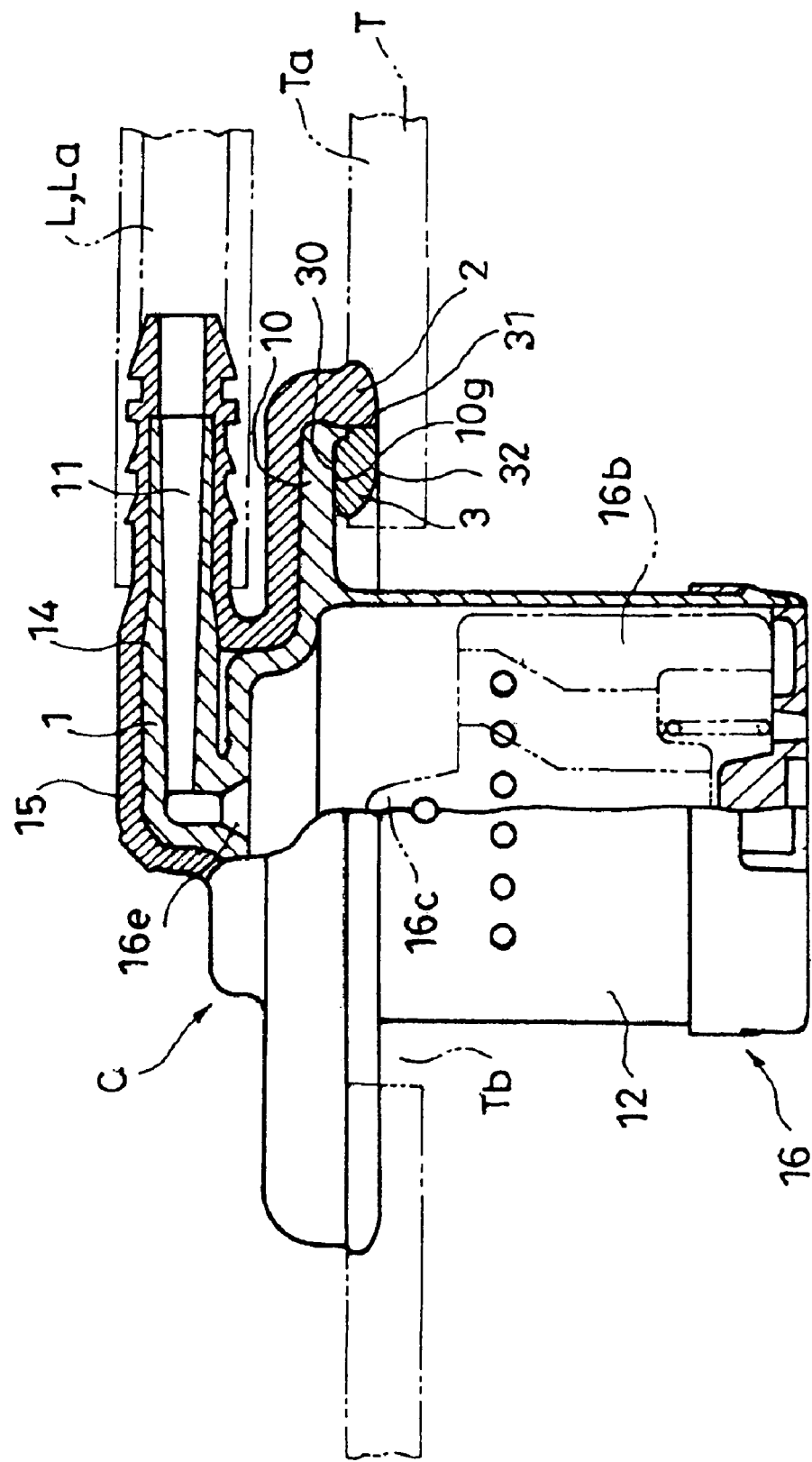
FIG. 2 is a schematic view showing how the connector is used, the essential parts being shown in section.
Figure 3:
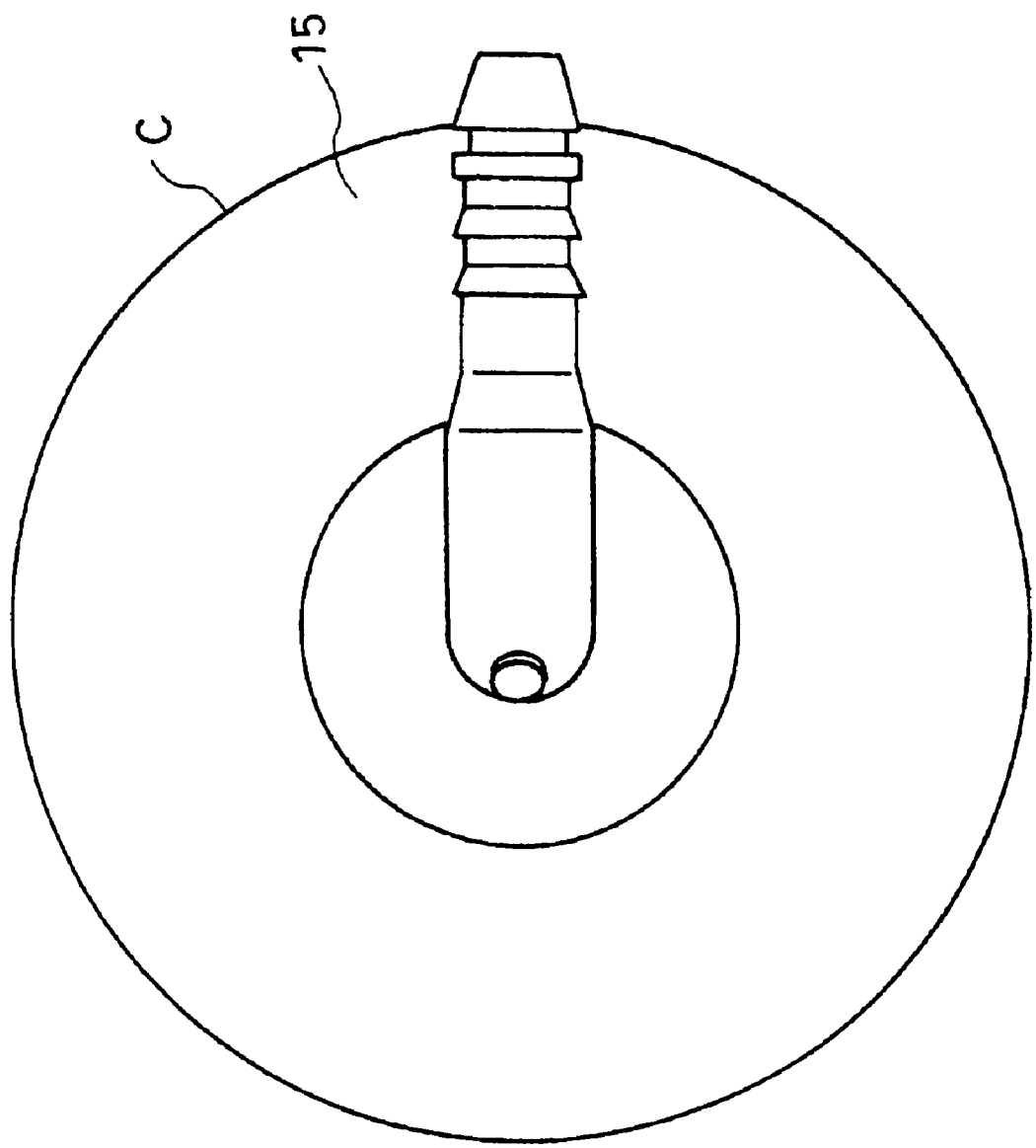
FIG. 3 is a plan view of the connector.
Figure 4:
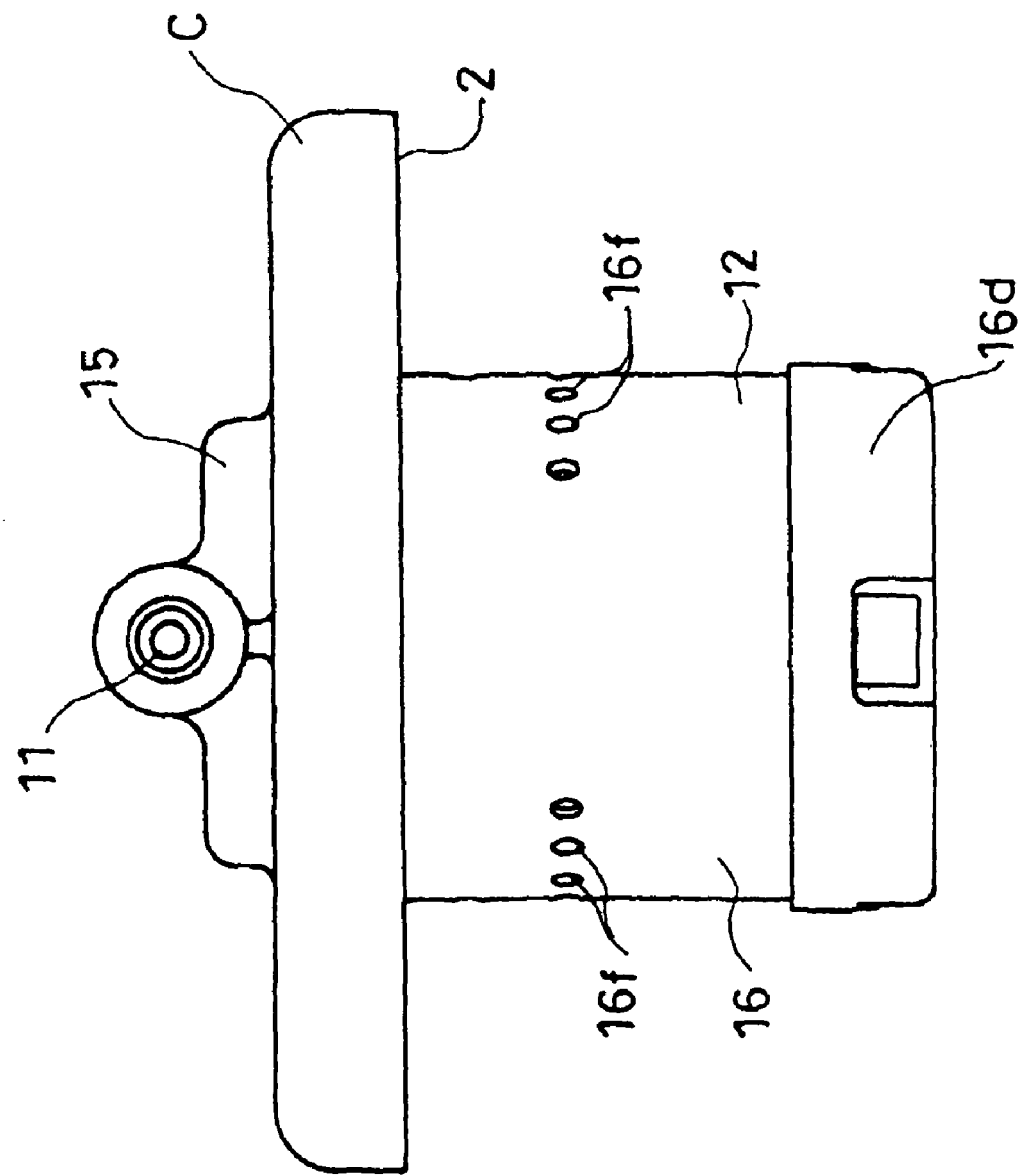
FIG. 4 is a side view of the connector.
Figure 5:
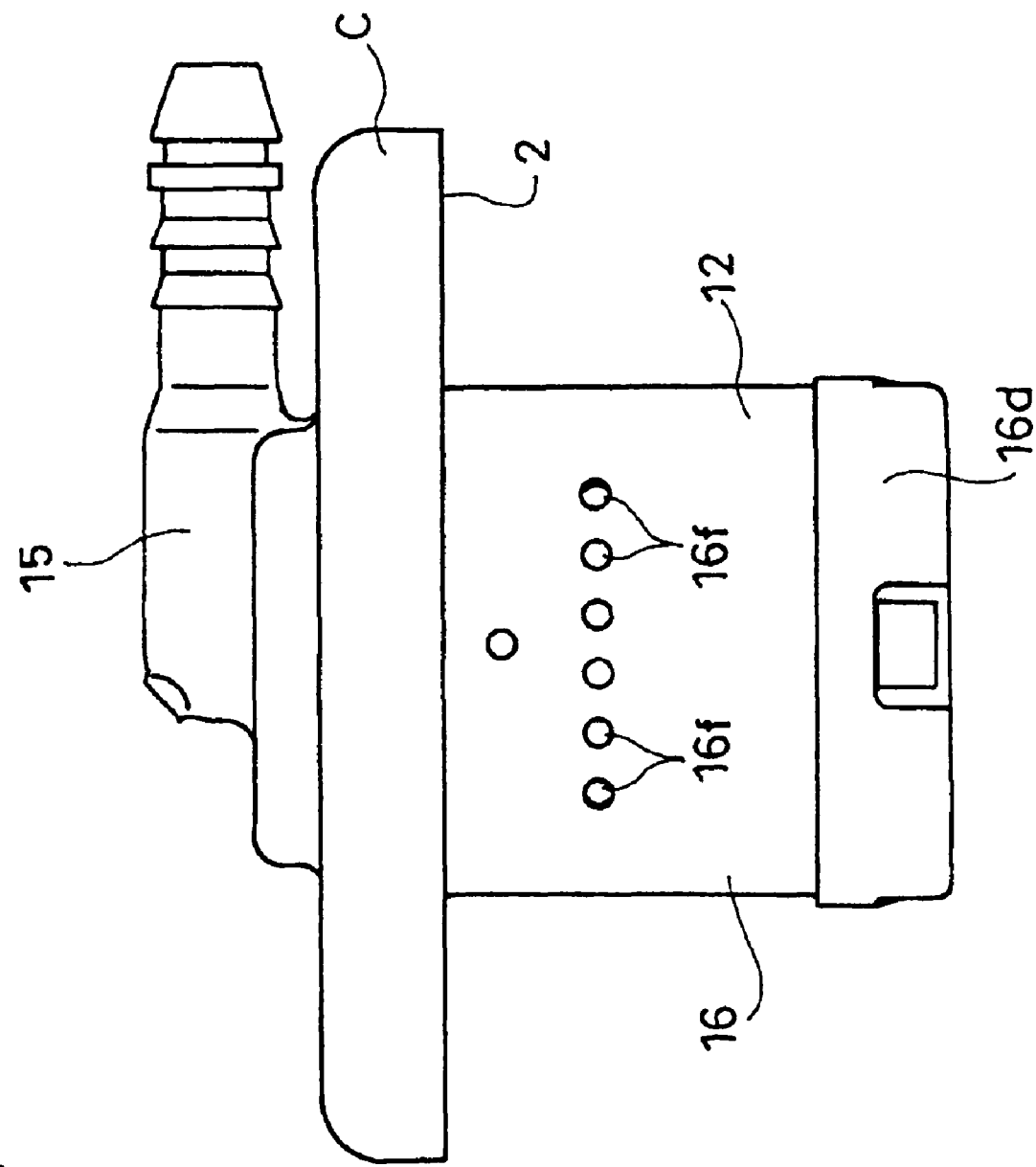
FIG. 5 is a front view of the connector.

It should be noted that FIG. 1 shows a state just before attaching the connector C according to this embodiment to a fuel tank T, FIG. 2 shows a state after attaching, and each of FIGS. 3 to 5 shows an appearance of the connector.

The connector C for a fuel tank according to the present invention is utilized to connect the fuel tank T for an automobile or the like with a delivery pipe L serving for, e.g. intake of fuel into the fuel tank T, delivery of fuel from the fuel tank T, or delivery of a gas from the fuel tank T, the fuel tank having an outer layer Ta formed of a synthetic resin.

The fuel tank T is typically supposed to include the outer layer Ta formed of polyethylene or a high-density of polyethylene, and an inner layer, and further includes a gas barrier layer (a layer formed of a material blocking the passage of a gas produced from fuel or making it difficult for such a gas to pass therethrough) between the outer layer Ta and the inner layer.

The delivery pipe L is typically supposed to be a pipe serving as a fuel feeding pipe or an air pipe La.

The connector C includes:
(1) a base member 1 having a flange 10 and a passage 11, the flange being of such a size to cover an opening Tb formed to pass through the fuel tank T, the passage communicating with the above-mentioned delivery pipe L;
(2) an outer melt-bonding projection 2 integrally formed with at least a projecting end 10a of the flange 10 of the base member 1;
(3) an inner melt-bonding member 3 formed in a ring shape and being of such a size to house the opening Tb formed in the fuel tank T, the inner melt-bonding member having an upper side 30 unified to a lower surface 10g of the flange 10 of the base member 1 and configured to have an outer lateral side 31 unified to an inner lateral side 20 of the outer melt-bonding projection 2.

In the shown embodiment, the base member 1 has an inserted portion 12 configured to be inserted into the fuel tank T from outside the fuel tank T.

The flange 10 is formed on the top of the inserted portion 12 so as to be of such a size as to cover the opening Tb when the inserted portion 12 is inserted into the opening Tb of the fuel tank T.

Specifically, in the shown embodiment, the flange 10 is formed of an upper circular plate 13, which has the inserted portion 12 integrally formed on a lower side thereof and an outer peripheral portion thereof projecting laterally from an outer peripheral side 12a of the inserted portion 12 so that a substantially equal distance is ensured around the outer peripheral side 12a of the inserted portion 12 between an outer edge of the upper circular plate 13 and the outer peripheral side 12a of the inserted portion 12.

In the shown embodiment, the base member 1 has a tubular portion 14 formed integrally with an upper portion thereof so as to project laterally from a substantially central portion of the upper circular plate 13 to have one end communicating with the inside of the base member 1. In the shown embodiment, the connector is configured so that a gas, which is produced from the fuel in the fuel tank T and flows through the inserted portion 12, is delivered outside the fuel tank T through the tubular portion 14, the inserted portion being formed as a cylindrical member 16a for flowing the gas as described later. In other words, the tubular portion 14 serves as the passage 11 communicating with the delivery pipe L in the shown embodiment. In the shown embodiment, the tubular portion 14 has a bent and laterally extending portion adapted to be air-tightly fitted into one end of the air pipe La so that the gas discharged through the tubular portion 14 is delivered to, e.g. a canister through the air pipe La thus connected.

In the shown embodiment, the entire top side 13a of the upper plate 13 of the base member 1 and the entire outer side of the tubular portion 14, which are formed as described above, are covered with a coating layer 15. The outer melt-bonding projection 2 is integrally formed with the coating layer 15 so as to project downward from the lower side of the upper plate 13 on the outer edge of the upper plate 13, i.e. the projecting end 10a of the flange 10.

Specifically, the outer melt-bonding projection 2 is annularly formed around and along the projecting end 10a of the flange 10. In the shown embodiment, the lower side 10g of the flange 10 has a circumferential ridge 10c formed thereon so as to be slightly spaced from an end face 10b thereof, the outer coating layer 15 is formed so as to wrap around from the upper side 13a of the upper plate 13 and cover the end face 10b and an outer side 10d of the circumferential ridge 10c and to project downward from a leading edge 10e of the circumferential ridge 10c. The downward projected portion of the outer coating layer serves as the outer melt-bonding projection 2.

In the shown embodiment, the inner melt-bonding member 3 is disposed in a ring shape between the inner lateral side 20 of the outer melt-bonding projection 2 and the peripheral side 12a of the inserted portion 12, which are formed as described above. In the shown embodiment, the inner melt-bonding member 3 is configured to have such a thickness as to place a lower side thereof, i.e. a projecting end face of the inner melt-bonding member 3 substantially flash with a projecting end face of the outer melt-bonding projection 2, i.e. a lower side of the outer melt-bonding projection 2. The inner melt-bonding member 3 is configured so that the upper side 30 covers the leading edge 10e and an inner side 10f of the circumferential ridge 10c and is integrally formed with the lower surface 10g of the flange 10, and that the outer lateral side 31 is integrally formed with the inner lateral side 20 of the outer melt-bonding projection 2. The inner melt-bonding member 3 has a portion in contact with the base member 1, enlarged by presence of the circumferential ridge 10c, increasing the integration with the base member 1.

In the shown embodiment, the outer melt-bonding projection 2 is formed of a first synthetic resin, which is melt-bondable to the outer layer Ta of the fuel tank T;
the base member 1 is formed of a second synthetic resin, which is an alloy of the first synthetic resin and a second synthetic resin difficult to pass a gas produced from fuel therethrough, or a second synthetic resin difficult to pass a gas produced from fuel therethrough and adaptable to the first synthetic resin; and the inner melt-bonding member 3 is formed of the first synthetic resin.

The connector C may be attached to the opening Tb so as to cover the opening Tb with the flange 10 of the base member 1 by inserting the inserted portion 12 of the base member 1 into the opening Tb of the fuel tank T until a lower portion 21 of the outer melt-bonding projection 2 and a lower portion 32 of the inner melt-bonding member 3 are brought into contact with an outer side of the fuel tank T, followed by melting the outer melt-bonding projection 2 and the outer melt-bonding projection 2 by, e.g. ultrasonic bonding, and curing the melted outer melt-bonding projection and outer melt-bonding projection to fix the outer melt-bonding projection and the outer melt-bonding projection to the outer layer Ta of the fuel tank T at the entire circumferences of the outer melt-bonding projection and the outer melt-bonding projection.

The connector C may also be attached to the opening Tb so as to cover the opening Tb with the flange 10 of the base member 1 by inserting the inserted portion 12 of the base member 1 into the opening Tb of the fuel tank T until such a lower portion 21 of the outer melt-bonding projection 2 and such a lower portion 32 of the inner melt-bonding member 3 are brought into contact with an outer side of the fuel tank T in such a state that the lower portion 21 of the outer melt-bonding projection 2 and the lower portion 32 of the inner melt-bonding member 3 are heated and melted, followed by curing the melted lower portion 12 of the melted outer melt-bonding projection 2 and the melted lower portion 32 of the outer melt-bonding projection 3 to fix the outer melt-bonding projection 2 and the outer melt-bonding projection 3 to the outer layer Ta of the fuel tank T.

In the connector C according to the embodiment, the outer melt-bonding projection 2 and the inner melt-bonding member 3 are both formed of the first synthetic resin, and the base member 1 is formed of an alloy of the first synthetic resin and the second synthetic resin or the second synthetic resin adaptable to the first synthetic resin. Accordingly, the outer melt-bonding projection 2 and the inner melt-bonding member 3 are melted and unified at contacting portions therebetween, and a combination of the base member 1 and the outer melt-bonding projection 2 and a combination of the base member 1 and the inner melt-bonding member 3 are melted and unified at contacting portions therebetween, respectively. A gas, such as hydrocarbon, which is produced from fuel, is prevented from leaking through the opening T-b by the second synthetic resin forming the base member 1. Further, the leakage of the gas through the melt-bonded portions between the connector C and the fuel tank T is minimized since the base member 1 is unified to the outer melt-bonding projection 2 and the inner melt-bonding member 3 at the melt-bonded portions as described above.

In the shown embodiment, it is possible to effectively prevent the gas from leaking through between the lower surface 10g of the flange 10 of the base member 1 and the upper side of the inner melt-bonding member 3.

When the connector C is formed by insert-molding with the inner melt-bonding member 3 used as an insert, the inner melt-bonding member 3 is easily and properly unified to the base member 1 and the outer melt-bonding projection 2. The inner melt-bonding member 3 serves to prevent the outer melt-bonding projection 2 from being deformed so as to slag inward of the flange 10 from the initial position thereof in a time period after and close to formation of the outer melt-bonding projection 2. In this case, the connector may be formed by molding the base member 1 with the inner melt-bonding member 3 being used as an insert, followed by molding the outer melt-bonding projection 2, or by simultaneously molding both of the base 1 and the outer melt-bonding projection with the inner melt-bonding member 3 being used as an insert.

When the second synthetic resin has a higher melting point than the first synthetic resin, portions of the inner melt-bonding member 3, as the insert, in contact with the base member 1 to be molded is easily re-melted by the second synthetic resin filled in a space for molding the base member 1 in the mold during insert-molding. Thus, the connector C is molded with the inner melt-bonding member 3 being firmly unified to the base member 1.

When the first synthetic resin is the same as the synthetic resin forming the outer layer Ta of the fuel tank T, the connector C is adaptably fixed to the fuel tank T by melt-bonding operation where the inner melt-bonding member 3 and the outer melt-bonding projection 2 are utilized.

When the outer layer Ta of the fuel tank T is formed of polyethylene or high-density polyethylene as the most typical case, the first synthetic resin is polyethylene, high-density polyethylene or modified polyethylene. In such a case, the second synthetic resin is polyamide or an alloy of polyamide and at least one of polyethylene, high-density polyethylene and modified polyethylene.

When the first synthetic resin is high-density polyethylene, it is most preferred that the second synthetic resin be an alloy of polyamide and high-density polyethylene. When the first synthetic resin is modified polyethylene, it is most preferred that the second synthetic resin is polyamide.

In the shown embodiment, the base member 1 is configured so that the inserted portion 12 serves as a fuel cutoff valve 16. In other words, the inserted portion 12 of the base member 1 is configured so as to include the cylindrical member 16a as a part thereof integrally connected to the lower side of the upper plate 13. The cylindrical member 16a of the inserted portion 12 has a float 16b configured to have a bottom normally brought into contact with an inner side of a cap 16d so as to close a lower end of the cylindrical member 16a by gravity, the cap being attached to the cylindrical member 16a. When the bottom of the float is brought into contact with the inner side of the cap, a valve projection 16c disposed on an upper side of the float 16b is apart from a valve seat 16e formed in a communication portion with the tubular portion 14. Between an outer side of the float 16b and an inner side of the cylindrical member 16a, a gap is ensured by an unshown rib, which is disposed on the inner side of the cylindrical member 16a. Thus, when the float 16b lowers, a gas, which enters the cylindrical member 16a through a through holes 16f formed in the cap 16d and through holes 16f formed in a lateral side of the cylindrical member 16a, is discharged outside from the tubular portion 14 through the gap. Although the float 16b is formed of a material having a slightly higher specific gravity than fuel, a helical compression spring 16g is interposed between a lower side of the float 16b and the inner side of the cap 16d. When fuel enters the cylindrical member 16a through the through hole 16f formed in the cap 16d and the through holes 16f formed in the lateral side of the cylindrical member 16a, the float 16b is rapidly raised under the action of the spring 16g, with the result that the valve projection 16c, which is formed in a substantially central portion of the upper side of the float 16b, seats on the valve seat 16e to prevent the fuel from entering the tubular portion 14.

The entire disclosure of Japanese Patent Application No. 2006-084506 filed on Mar. 27, 2006 including specification, claims, drawings and summary is incorporated herein by reference in its entirety.

The invention claimed is:

1. A connector for connecting a fuel tank with a delivery pipe, comprising:
    a base member having a flange and a passage, the flange having a size to cover an opening formed in the fuel tank, the passage being adapted to communicate with the delivery pipe;
    an outer melt-bonding projection integrally formed with at least a projecting end of the flange of the base member;
    a cylindrical member adapted to house a float, the cylindrical member being unitarily formed with the flange of the base member;
    an inner melt-bonding member formed in a ring shape and having a size to house the opening formed in the fuel tank, the inner melt-bonding member having an upper side unified to a lower surface of the flange of the base member and configured to have an outer lateral side unified to an inner lateral side of a projecting end of the outer melt-bonding projection;
    the outer melt-bonding projection being formed of a first synthetic resin, which is melt-bondable to an outer layer of the fuel tank;
    the base member being formed of an alloy of the first synthetic resin and a second synthetic resin difficult to pass a gas produced from fuel therethrough, or the second synthetic resin difficult to pass a gas produced from fuel therethrough and adaptable to the first synthetic resin; and
    the inner melt-bonding member being formed of the first synthetic resin;
    wherein the connector is configured to be molded by insert-molding with the inner melt-bonding member used as an insert; and
    the second synthetic resin has a higher melting point than the first synthetic resin.

2. The connector for a fuel tank according to claim 1, wherein the first synthetic resin is of the same synthetic resin as a synthetic resin forming the outer layer of the fuel tank.

3. The connector for a fuel tank according to claim 1, wherein a surface of the outer melt-bonding projection which is adapted to face and contact an outer surface of the fuel tank and a surface of the inner melt-bonding member which is adapted to face and contact the outer surface of the fuel tank, are both straight, flat and are essentially contiguous with one another.

4. The connector for a fuel tank according to claim 1, wherein the inner melt-bonding member which is formed in a ring shape is a discrete, solid ring-shaped member.

5. A connector for connecting a fuel tank with a delivery pipe, comprising:
    a base member having a flange and a passage, the flange having a size to cover an opening formed in the fuel tank, the passage being adapted to communicate with the delivery pipe;
    an outer melt-bonding projection integrally formed with at least a projecting end of the flange of the base member;
    an inner melt-bonding member formed in a ring shape and having a size to house the opening formed in the fuel tank, the inner melt-bonding member having an upper side unified to a lower surface of the flange of the base member and configured to have an outer lateral side unified to an inner lateral side of the outer melt-bonding projection;
    the outer melt-bonding projection being formed of a first synthetic resin, which is melt-bondable to an outer layer of the fuel tank;
    the base member being formed of an alloy of the first synthetic resin and a second synthetic resin difficult to pass a gas produced from fuel therethrough, or the second synthetic resin difficult to pass a gas produced from fuel therethrough and adaptable to the first synthetic resin; and
    the inner melt-bonding member being formed of the first synthetic resin,
    wherein the flange includes an upper surface, a lateral end face, and a circumferential ridge spaced from the lateral end face and projecting downwardly from an under surface of the flange.

6. The connector for a fuel tank according to claim 5, wherein the outer melt-bonding projection includes an outer coating layer disposed on the upper surface of the flange, the melt-bonding projecting extending from the outer coating layer, wrapping around from the upper surface, covering the circumferential ridge and projecting downwardly from the circumferential ridge.

7. The connector for a fuel tank according to claim 6, wherein said inner melt-bonding member is disposed only under the flange and contacts the melt-bonding projection only at a lateral side thereof.

* * * * *